(12) United States Patent
Neiger et al.

(10) Patent No.: US 10,713,177 B2
(45) Date of Patent: Jul. 14, 2020

(54) DEFINING VIRTUALIZED PAGE ATTRIBUTES BASED ON GUEST PAGE ATTRIBUTES

(71) Applicant: Intel Corporation, Santa Clara, CA (US)

(72) Inventors: Gilbert Neiger, Hillsboro, OR (US); Baiju V. Patel, Portland, OR (US); Gur Hildesheim, Haifa (IL); Ron Rais, Hadera (IL); Andrew V. Anderson, Forest Grove, OR (US); Jason W. Brandt, Austin, TX (US); David M. Durham, Beaverton, OR (US); Barry E. Huntley, Hillsboro, OR (US); Raanan Sade, Ha (IL); Ravi L. Sahita, Beaverton, OR (US); Vedvyas Shanbhogue, Austin, TX (US); Arumugam Thiyagarajah, Folsom, CA (US)

(73) Assignee: Intel Corporation, Santa Clara, CA (US)

(*) Notice: Subject to any disclaimer, the term of this patent is extended or adjusted under 35 U.S.C. 154(b) by 224 days.

(21) Appl. No.: 15/260,893

(22) Filed: Sep. 9, 2016

(65) Prior Publication Data
US 2018/0074969 A1    Mar. 15, 2018

(51) Int. Cl.
*G06F 12/1009* (2016.01)
*G06F 12/14* (2006.01)
*G06F 9/455* (2018.01)

(52) U.S. Cl.
CPC ...... *G06F 12/1009* (2013.01); *G06F 9/45545* (2013.01); *G06F 9/45558* (2013.01);
(Continued)

(58) Field of Classification Search
CPC ............... G06F 12/1009; G06F 12/145; G06F 2009/45583; G06F 9/45545; G06F 9/45558
See application file for complete search history.

(56) References Cited

U.S. PATENT DOCUMENTS

| 4,677,546 A | 6/1987 | Freeman et al. |
|---|---|---|
| 5,317,717 A | 5/1994 | Cutler et al. |

(Continued)

FOREIGN PATENT DOCUMENTS

KR    10-2015-0119038 A    10/2015

OTHER PUBLICATIONS

"System on chip" Wikipedia NPL as captured by Wayback Machine Archive on Jun. 2, 2016. Also available at https://web.archive.org/web/20160602072151/https://en.wikipedia.org/wiki/System_on_a_chip (Year: 2016).*

(Continued)

*Primary Examiner* — Baboucarr Faal
*Assistant Examiner* — Jane Wei
(74) *Attorney, Agent, or Firm* — Lowenstein Sandler LLP

(57) ABSTRACT

A processing system includes a processing core to execute a virtual machine (VM) comprising a guest operating system (OS) and a memory management unit, communicatively coupled to the processing core, comprising a storage device to store an extended page table entry (EPTE) comprising a mapping from a guest physical address (GPA) associated with the guest OS to an identifier of a memory frame, a first plurality of access right flags associated with accessing the memory frame in a first page mode referenced by an attribute of a memory page identified by the GPA, and a second plurality of access right flags associated with accessing the memory frame in a second page mode referenced by the attribute of the memory page identified by the GPA.

18 Claims, 12 Drawing Sheets

(52) U.S. Cl.
CPC ........ *G06F 12/145* (2013.01); *G06F 12/1441* (2013.01); *G06F 12/1491* (2013.01); *G06F 2009/45583* (2013.01); *G06F 2009/45587* (2013.01); *G06F 2212/151* (2013.01); *G06F 2212/651* (2013.01)

(56) References Cited

U.S. PATENT DOCUMENTS

| | | | |
|---|---|---|---|
| 6,854,039 | B1 | 2/2005 | Strongin et al. |
| 7,111,146 | B1 | 9/2006 | Anvin |
| 7,680,999 | B1* | 3/2010 | Morris ............... G06F 9/468 711/151 |
| 9,747,052 | B2 | 8/2017 | Grisenthwaite et al. |
| 10,114,768 | B2 | 10/2018 | Hildesheim et al. |
| 2002/0144077 | A1* | 10/2002 | Andersson ............ G06F 12/145 711/203 |
| 2002/0194389 | A1 | 12/2002 | Worley, Jr. et al. |
| 2004/0117593 | A1* | 6/2004 | Uhlig ................. G06F 12/1036 711/207 |
| 2008/0222397 | A1 | 9/2008 | Wilkerson et al. |
| 2011/0202739 | A1 | 8/2011 | Grisenthwaite |
| 2012/0151117 | A1 | 6/2012 | Tuch et al. |
| 2012/0191899 | A1 | 7/2012 | Zbiciak et al. |
| 2013/0103984 | A1 | 4/2013 | Nakaide et al. |
| 2014/0173169 | A1* | 6/2014 | Liu ..................... G06F 12/1009 711/6 |
| 2014/0201422 | A1* | 7/2014 | Tseng ................. G06F 9/45558 711/102 |
| 2014/0331023 | A1 | 11/2014 | Sharp et al. |
| 2014/0380009 | A1 | 12/2014 | Lemay et al. |
| 2016/0041921 | A1 | 2/2016 | Friedman et al. |
| 2016/0092371 | A1 | 3/2016 | Shanbhogue |
| 2016/0092678 | A1 | 3/2016 | Probert et al. |
| 2016/0110298 | A1 | 4/2016 | Koufaty et al. |
| 2016/0162698 | A1 | 6/2016 | Vipat et al. |
| 2016/0188492 | A1 | 6/2016 | Bachwani et al. |
| 2016/0253193 | A1 | 9/2016 | Tsirkin |
| 2017/0255569 | A1 | 9/2017 | Sartorius et al. |

OTHER PUBLICATIONS

Anthony, Sebastian. "SoC vs. CPU—The battle for the future of computing" pushed on Apr. 19, 2012 by ExtremeTech.com. Available at <https://www.extremetech.com/computing/126235-soc-vs-cpu-the-battle-for-the-future-of-computing>. (Year: 2012).*

PCT, International Search Report and Written Opinion for International Application No. PCT/US2017/046812, dated Nov. 9, 2017, 13 pages.

"Demonstrating Seconds Morgan's Law Using the First One and Double Negation," https://math.stackexchange.com/questions/945003/demonstrating-seconds-morgans-law-using-the-first-one-and-double-negation, 2 pages, Published Sep. 2014.

Riley, Ryan, Xuxian Jiang, Dongyan Xu, "An Architectural Approach to Preventing Code Injection Attacks," IEEE Transactions on Dependable and Secure Computing vol. 7, No. 4, pp. 351-365, Oct.-Dec. 2010.

PCT, International Search Report and Written Opinion for International Application No. PCT/US2017/043388, dated Oct. 26, 2017, 15 pages.

* cited by examiner

DEFINING VIRTUALIZED PAGE ATTRIBUTES BASED ON GUEST PAGE ATTRIBUTES

TECHNICAL FIELD

The present disclosure relates to memory management and, more specifically, to specify certain attributes of memory frames based on attributes of guest physical address (GPA) pages.

BACKGROUND

A computing device may include one or more processing cores in one or more processors (such as central processing units (CPUs)) for executing instructions and a memory device (such as random-access memory (RAM)) for storing instructions and data associated with executing tasks (including user application and system application such as the kernel of an operating system) on the one or more processing cores. Instructions of each application program may access the memory using virtual addresses (or linear addresses) in a virtual memory address space. A memory management unit may use a page table to translate virtual addresses into physical addresses of the memory.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
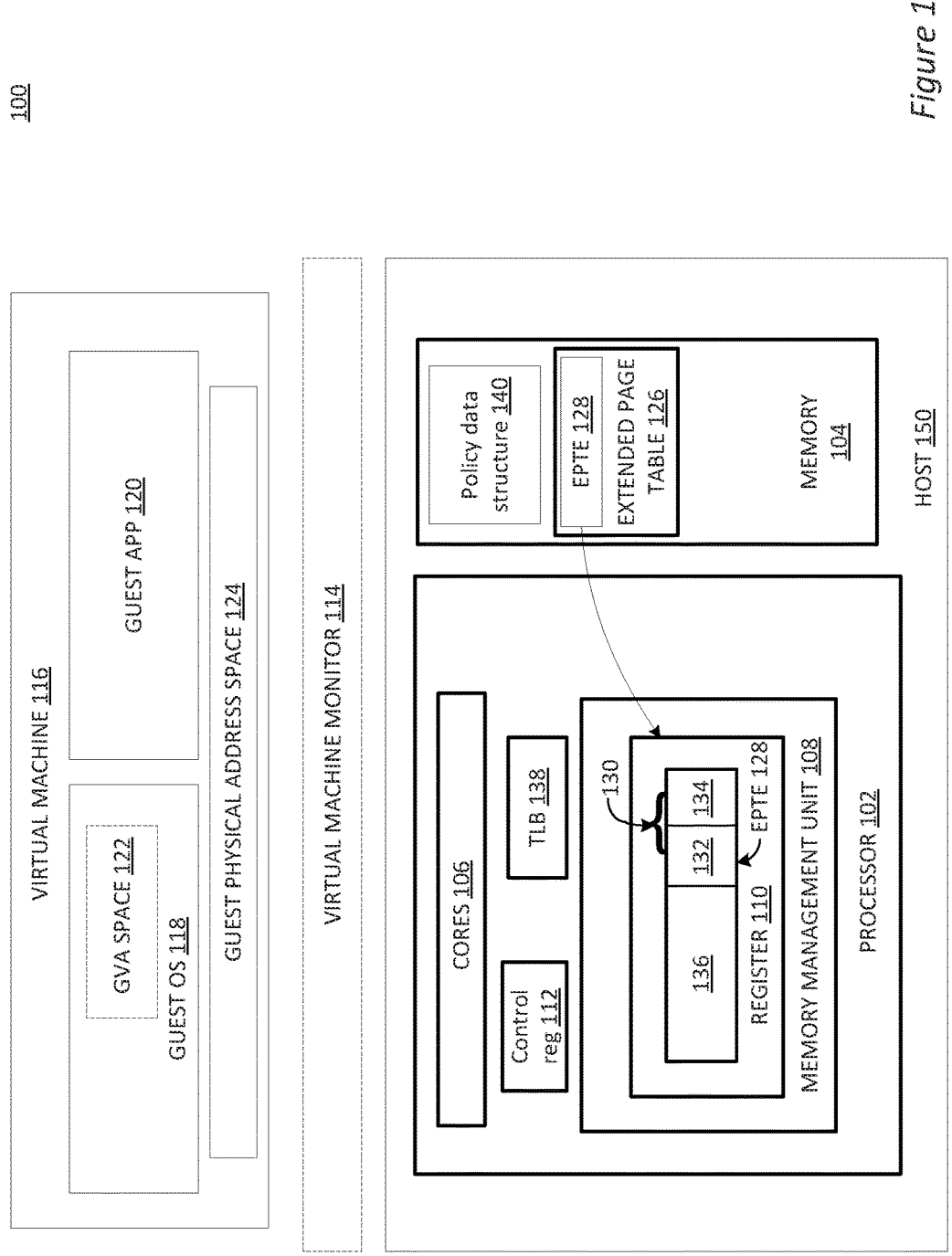
FIG. 1 illustrates a processing system to protect the memory according an embodiment of the present disclosure.

Certain hardware processor architectures provide mechanism to support memory address mappings (e.g., from guest physical address space to host physical address space). For example, a processor may execute a virtual machine monitor (VMM) that may support multiple virtual machines (VMs). Each VM may include a guest operating system and run guest software applications. The VMM may employ an auxiliary page table (referred to as the extended page table (EPT)) to translate guest physical addresses (GPAs) used by a guest operating system to the host physical addresses (referred to as physical addresses) for accessing the memory used by the processor of the host machine. The guest physical address space may be organized as pages (referred to as guest memory pages) of a fixed size (e.g., 4 KB) identified by identifiers (referred to as GPA page numbers) associated with the guest memory pages. The host physical address space may be organized as memory frames of a fixed size (e.g., 4 KB) identified by identifiers (referred to as memory frame numbers) associated with memory frames.

In some implementations, the VMM may specify certain access rights to the memory frames, where the access rights define the limitations for a guest software application to access these memory frames. The access rights may include rights for read (R), write (W), and/or execute (X). Each right may be specified using a flag (e.g., one-bit flag) stored in a register so that if it is enabled (e.g., flag="1"), the guest software application has the corresponding type of access rights; if it is disabled (e.g., flag="0"), the guest software application does not have the corresponding type of access rights.

The EPT may include multiple entries referred to as EPT entries (EPTEs) that each stores a memory mapping from one or more guest memory pages in the GPA space to one or more memory frames in the physical address space, and a plurality of access right flags associated with these memory frames. The VMM specifies the access rights based on the guest physical address and certain attributes of the guest physical address (e.g., user mode or supervisor mode). VMM, however, does not rely upon on the access rights for a corresponding virtual address which are specified by the guest OS. The guest operating system may have specified the access rights of these guest memory pages to constrain access to these guest memory pages by guest software applications under the guest operating system controls.

In general, the VMM may seek to use memory address mapping tables such as the extended page table (EPT) to protect memory without needing to know the details of how guest software intends to manage the memory. In many situations, however, the VMM may need to enhance the memory protection further with certain attributes of the virtual address assigned by the guest operating system of the virtual machine. For example, the VMM may want to specify protections to a memory frame based on a page mode (e.g., supervisor mode or user mode) for a virtual address specified by the guest operating system. The page mode is a bit (U/S bit) assigned to a virtual address page by the guest operating system to control the access to the page. If the bit is set (e.g., to "1") to the user mode, it can be accessed by both applications running in the user mode and the supervisor mode. If the bit is set (e.g., to "0") to the supervisor mode, it can be accessed only by applications running in the supervisor mode. If the underlying hardware architecture does not provide for the EPTEs to account for the page mode, the VMM needs to apply the most restrictive permissions among different page modes to the frame, ensuring that the processor does not allow any undesired accesses. This approach may require the VMM to intercept every memory access request made by the virtual machine to the memory frame. The examination of the page modes associated with the page by the VMM may degrade VMM performance.

Embodiments of the present disclosure include an expanded set of access right flags that the VMM may specify how access rights may be based on one or more paging attributes controlled by the guest OS (e.g., the user/supervisor mode). The VMM may specify the access rights according to rules stored in a policy data structure. For example, the existing access right flags stored in an EPTE may be expanded from (R, W, X) to (RU, WU, XU, RS, WS, XS), wherein (RU, WU, XU) are the access rights of "read", "write", and "execute" associated with the user mode assigned to a virtual address by the guest operating system, and (RS, WS, XS) are the access rights of "read", "write", and "execute" associated with the supervisor mode assigned to a virtual address by the guest operating system. The VMM may specify these access rights according to the page mode specified by the guest OS.

FIG. 1 illustrates a processing system 100 to protect the memory according an embodiment of the present disclosure. Processing system 100 may include a host computer 150 that may further include a processor (such as a central processing unit (CPU)) 102 and a memory 104 that is communicatively coupled to processor 102. In one embodiment, processor 102 and memory 104 may be fabricated on a system-on-a chip (SoC). The memory 104 may store system application and user application programs, and the data associated with these programs. The processor 102 may execute tasks such as system applications and user applications using the memory 104 to store the instructions of the programs and data associated with the programs.

The processor 102 may further include one or more processing cores 106, a memory management unit (MMU) 108, one or more control registers 112. Processing cores 106 are logic circuits within the processor 102 for executing certain tasks (e.g., software applications). In one embodiment, the tasks executed on processing cores 106 do not access the memory 104 directly using the physical addresses of the memory. Instead, the tasks access a virtual memory through virtual addresses (also known as linear addresses). The memory management unit 108, coupled between the processing cores 106 and the memory 104, may map the virtual addresses of the virtual memory to the physical addresses of the memory 104. The space of virtual addresses may be divided into fixed sized units called pages. A page of the virtual addresses may be mapped correspondingly into a fixed-sized unit in the physical address space of the memory 104 called a memory frame.

In one embodiment, processor 102 may include a logic circuit implemented to support execution of a set of virtualization instructions (e.g., virtual-machine extension (VMX)) to provide support for one or more virtualization environments ported on host 150. The VMX may provide processor-level support for virtual machines. In one embodiment, the VMX may include instructions to support a virtual machine monitor (VMM) 114 that is a host program that allows one or more execution environments (or virtual machines (VMs)) to run on the host 102. Referring to FIG. 1, VMM 114 may create and run virtual machines (VMs) 116.

VMs 116 may behave like a hardware computing device to end users. For example, VMs 116 may each include a virtual processor (not shown) that emulates a hardware processor. The virtual processor associated with VMs 116 may support a respective guest operating system (guest OS) 118. Guest applications 120 may run within the environments of guest operating systems 118. Guest operating systems 118 (including kernels) can include a number of guest-OS components (or kernel components) to provide a number of services to guest applications 120. In one embodiment, these guest-OS components run at the same processor privilege level (e.g., the highest ring 0 privilege level). In one embodiment, the guest-OS provided services may include scheduler, process management, I/O management, memory management, drivers (e.g., file system and volume drivers, mass storage drivers, and bus drivers), and code integrity management services. The ring 0-2 privilege levels are commonly referred to as the supervisor mode and the ring-3 privilege level is commonly referred to as the user mode. The guest OS 118 may assign a page mode attribute (e.g., a user mode or a supervisor mode) of a page in the guest virtual address space.

VMs 116 including guest OS 118 and guest application 120 may access memory 104 through a series of memory space mappings. Guest OS 118 may construct a guest virtual address (GVA) space 122 that may be mapped to a corresponding guest physical address (GPA) space 124 for a VM 116. GPA space 124 may be organized according to guest memory pages that each has a fixed size. Each one of the guest memory pages may be associated with an identifier that uniquely identifies the GPA page. A control register (e.g., CR3) associated with the processor 102 may contain the base address of the page directory that may be used to calculate a mapping between the GVA space 122 and the corresponding GPA space 124.

In addition to specifying guest physical addresses, the mapping between the GVA space 122 to GPA space 124 may also specify, for each virtual address page, certain attributes for that page as determined by the guest operating system. These attributes may include access rights that control how the resulting guest-physical address may be accessed. An example access right that may be specified for a virtual address page is the page mode. The page mode may be U (user/supervisor), indicating that the page may be accessed by software operating in either the user mode or the supervisor mode; or S (supervisor-only), indicating that the page may be accessed only by software operating in the supervisor mode.

The GPA space 124 of VM 115 may be mapped to the host physical address (HPA) space of the host system 150. During execution of a guest application 120, responsive to a request to access memory 104, memory management unit 108 may use the host physical addresses to access memory 104. The HPA space may be organized according memory frames that each has a fixed size. Each one of the memory frames may be associated with an identifier (e.g. memory frame number) that uniquely identifies the memory frame. Processing core 106 may execute VMM 114 to create a mapping from the GPA space 124 of VM 116 to the HPA space of the host. The mapping may be stored in an extended page table (EPT) 126 stored in memory 104. In one embodiment, a policy data structure 140 stored in memory 104 may include rules that specify how to determine the access rights stored in EPTEs based on the corresponding page attributes (e.g., the user mode or the supervisor mode). Thus, the VMM 114 may specify access rights in an EPTE different from the access rights assigned to the corresponding guest virtual address page by the guest OS 118. In this way, VMM 114 may provide a further layer of protection to a memory frame by modifying the access rights stored in the EPTE based on rules.

VMM 114 may construct EPT 126 using EPT entries (EPTEs) that may each specify a mapping from an identifier of a GPA page to an identifier of a memory frame. As shown in FIG. 1, EPT 126 may include EPTEs 128 for storing the mappings between guest memory pages and memory frames.

EPTE 128 may store one or more memory frame numbers that are associated with GPA page numbers. In one embodiment, guest application 120 may allocate a block of memory by specifying one or more guest virtual address ranges (e.g., a number of GPA page numbers). Guest OS 118 may translate the guest virtual addresses in GVA space 122 into guest physical addresses in GPA space 124. Memory management unit 108 may employ EPTEs 128 in EPT 126 specified by VMM 114 to map guest physical addresses into host physical addresses for accessing memory. In one embodiment, memory management unit 108 may load an EPTE 128 of EPT 126 into a register 110 associated with memory management unit 108 so that the memory management unit 108 may perform the memory address mapping on behalf of processing cores 106.

In addition to the mapping from a guest physical address to a host physical address, EPTE 128 may also include fields to store certain attributes, determined by the VMM, for the guest physical address. These attributes may include access rights that control how the guest physical address may be accessed. Example access rights include R, W, and X, indicating whether software operating in the VM may read, write, or execute from the guest physical address, respectively.

In one embodiment of the present disclosure, the attributes specified in an EPTE for a guest physical address may depend upon the attributes specified by the guest OS for the guest virtual address that mapped to that guest physical address. In one embodiment, EPTE 128 may store several sets of access rights flags, where each set is associated with a page mode attribute associated with the GPA. In another embodiment, EPTE 128 may store sets of access right flags that each is associated with a page attribute other than the page mode. For example, EPTE 128 may include a first set of access right flags (including at least one of RU, WU, or XU) that may be specified by VMM 114 to constrain requests to access guest virtual addresses that were mapped using the user mode and a second set of access right flags (including at least one of RS, WS, or XS) that may be specified by VMM 114 to constrain requests to access guest virtual addresses that were mapped using the supervisor mode.

Thus, as shown in FIG. 1, EPTE 128 may include a first field 136 to store a mapping from guest memory pages to memory frames and a second field 130 to store at least one access right flag 132 associated with a first page attribute value of the guest memory pages (e.g., user mode) and at least one access right flag 134 associated with a second page attribute of the guest memory pages (e.g., supervisor mode). Memory management unit 108 may use the access right flags (132, 134) stored in EPTE 128 to constrain memory accesses.

Memory management unit 112 may include logic circuits to check the memory access rights during execution of guest applications 120 to prevent certain types of memory accesses (e.g., those caused by stray accesses) that are not permitted by VMM 114 as specified in EPTE 128. In one embodiment, access right flags (132, 134) stored in EPTE 128 may include one or more status bits to indicate certain page access statuses that need to be checked before accessing memory frame numbers mapped to in EPTE 128. For example, the each one of access right flags may be represented by one bit, where an access right is enabled when the bit value is one ("1") and the access right is disabled when the bit value is zero ("0"). Thus, RU bit=1/0, indicating reads from user pages are enabled/disabled; WU bit=1/0, indicating writes to user pages are enabled/disabled; XU bit=1/0, indicating execution from user pages is enabled/disabled; RS bit=1/0, indicating reads from supervisor pages are enabled/disabled; WS bit=1/0, indicating writes to supervisor pages are enabled/disabled; XS bit=1/0, indicating execution from supervisor pages is enabled/disabled.

The page mode, i.e., supervisor mode or user mode, is one of the attributes associated with guest memory pages accessed by guest application 120 running on VM 116. In one embodiment, page mode associated with a guest virtual address may store be determined by a U/S (user/supervisor) bit that the guest operating system associates with the page. For example, U/S bit=1 may indicate a user-mode page in the GVA space (i.e., one accessible to software operating in either user mode or in supervisor mode); U/S bit=0 may indicate supervisor-mode page in the GVA space (i.e., one accessible only to software operating in supervisor mode).

During execution of guest application 120, memory management unit 108 may receive a request including guest virtual address page numbers to map these guest memory pages to memory frame numbers in the physical address space. To speed up the memory address mapping, memory management unit 104 may perform the memory address mapping and store the memory address mapping (e.g., a mapping between a guest virtual address page number to a memory frame number) in a buffer 138 (e.g., a translation lookaside buffer (TLB)) stored in processor 102. Buffer 138 may include multiple buffer entries. Each one of the buffer entry may include a first field to store a mapping between one guest virtual address page and one memory frame, and a second field to store the access right flags (e.g., R, W, X) associated with the memory frame. In one embodiment, memory management unit 108 may determine which access right flags to copy to the buffer entry based on the GPA page attribute value (e.g., U/S bit value) of the GPA page to which the guest virtual address page was mapped.

In one embodiment, if the U/S bit indicates the user mode, memory management unit 108 copies the first set of access right flags (RU, WU, XU) stored in field 132 of EPTE 128 to the corresponding field for R, W, and X in the buffer entry. If the U/S bit indicates supervisor mode, memory management unit 108 copies the second set of access right flags (RS, WS, XS) stored in field 134 of EPTE 128 to the corresponding field for R, W, and X in the buffer entry. The TLB does not distinguish read, write, and execute access rights based on the U/S bit, and the TLB may use the U/S bit to deny access to supervisor pages to software operating in user mode.

In one embodiment, the separation of access right flags according to an attribute (e.g., U/S bit) associated with guest memory pages may be enabled or disabled according to a configuration flag. In one embodiment, the configuration flag may be stored in a control register 122 (e.g., CR4) associated with processor 102. In another embodiment, the virtual machine control structure of VM 116 may include a field to store the configuration flag. Responsive to determining that the configuration flag indicates an enablement (e.g., configuration flag="1"), memory management unit 108 may selectively copy the access right flags to TLB 138 based on the U/S bit as discussed above. Responsive to determining that the configuration flag indicates a disablement (e.g., configuration flag="0"), memory management unit 108 may copy pre-determined access right flags (e.g., R, W, and X) to the TLB 138, disregarding the U/S bit value.

Figure 2:
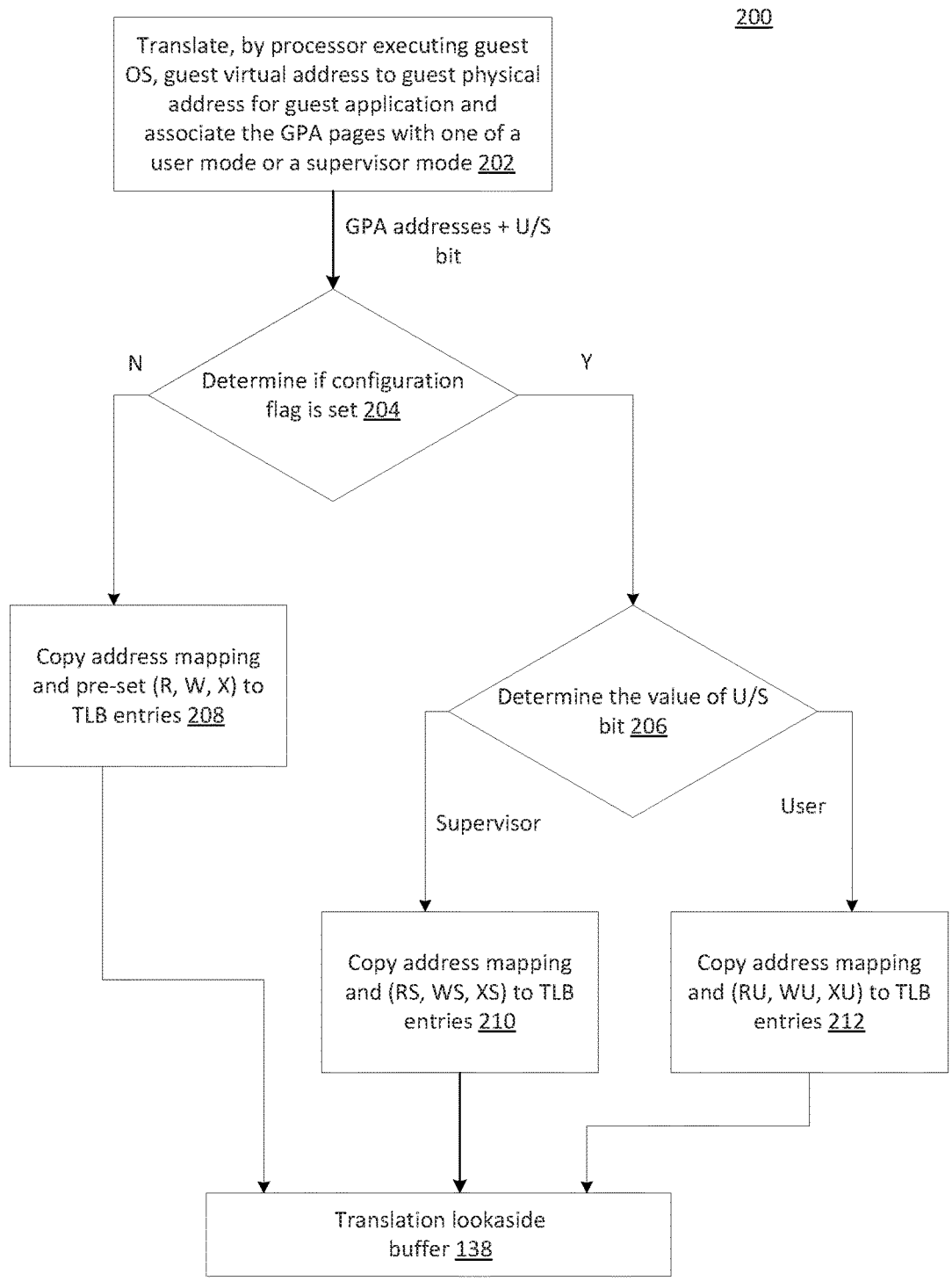
FIG. 2 illustrates a flowchart to show the process of memory address translation according to an embodiment of the present disclosure.

FIG. 2 illustrates a flowchart to show the process 200 of memory address translation according to an embodiment of the present disclosure. At 202, responsive to a request by a guest application to access the memory, the guest operating system running on a processor may translate the guest virtual addresses employed by the guest application to guest physical addresses and determine whether the page mode of a guest virtual address is user mode or supervisor mode (as indicated by a U/S bit associated with the guest virtual address). The processor may generate an output including the GPA addresses and the U/S bit value.

At 204, a memory management unit of the processor may receive the GPA addresses and determine whether a configuration flag indicating the expanded EPTE is set. Responsive to determining that the configuration flag is set, at 206, the memory management unit may determine the value of the U/S bit. If the value of the U/S bit indicates a user mode page, at 212, the memory management unit may identify the corresponding address mapping in the extended page table entry, and copy the address mapping and the access right flags for a user mode page (e.g., RU, WU, XU) to the TLB entry. If the U/S bit indicates a supervisor mode page, at 210, the memory management unit may identify the address mapping in the extended page table entry, and copy the address mapping and the access right flags associated with the supervisor mode (e.g., RS, WS, XS) to the TLB entry.

Responsive to determining that the configuration flag is not set, at 208, the memory management unit may just copy the address mapping and a pre-determined access right flags (e.g., R, W, X) to the TLB entries disregarding the value of U/S bit.

Figure 3:
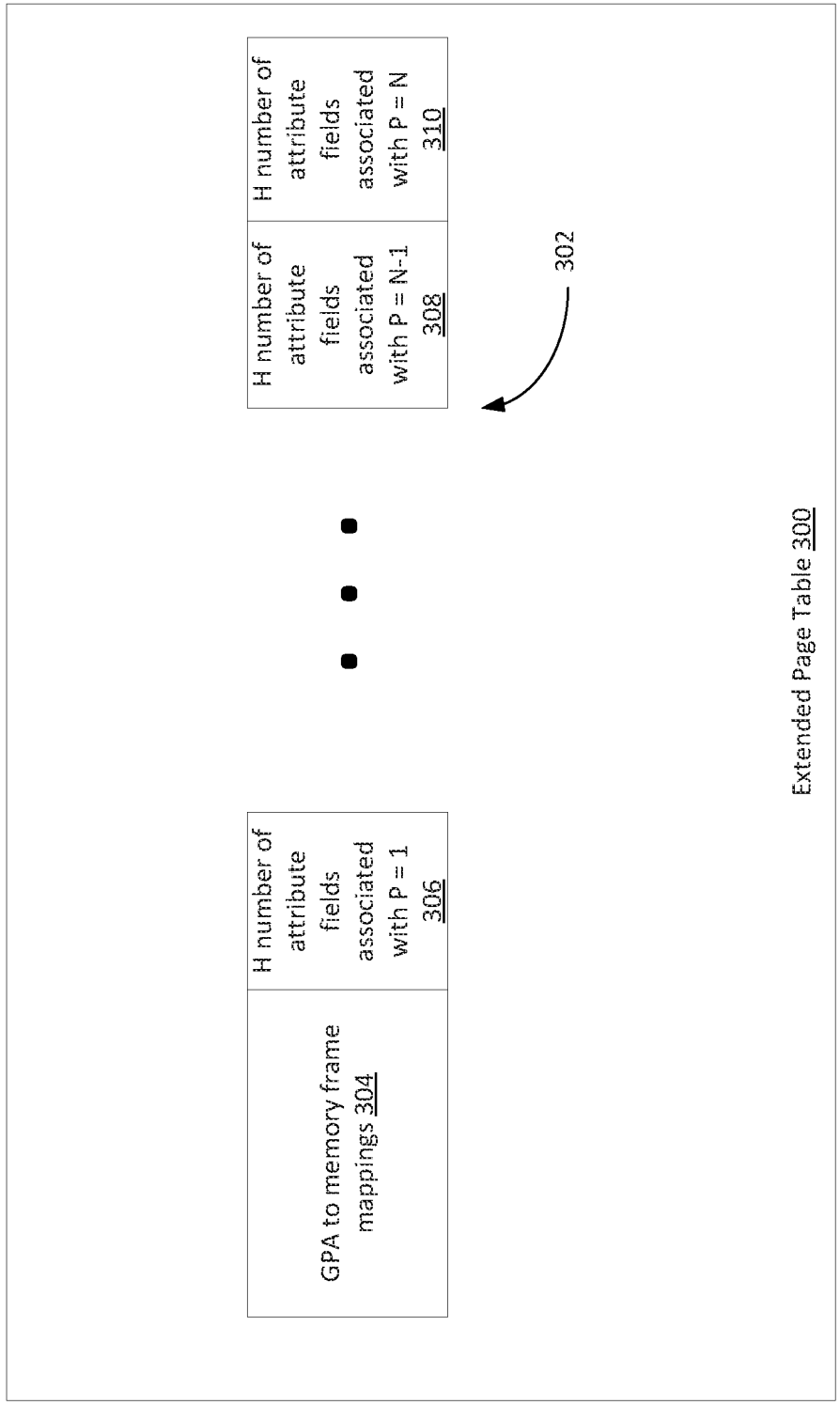
FIG. 3 illustrates an extended page table according to an embodiment of the present disclosure.

Although the discussion is in the context of the paging attribute of user/supervisor mode and the access right flags (R, W, X), embodiments of the present disclosure may also apply to other paging attributes other than the U/S bit. FIG. 3 illustrates an extended page table 300 according to an embodiment of the present disclosure. As shown in FIG. 3, an EPTE 302 may include a first field 304 to store memory address mappings between guest memory pages to memory frames. EPTE 302 may further include fields 306-310 to store a number of attribute fields associated with different paging attributes of the guest memory pages. For example, the guest memory pages may have P=1, N-1, N attributes (e.g., U/S bit, modified (set when a page is written to), referenced (referenced by reading or writing), present/absent (whether the page is physically present in the memory) etc.) and H number of attribute values (e.g., H=3 for the access rights of R, W, X etc.).

As shown in FIG. 3, EPTE 302 may store the H attribute values associated with the attribute P=1 in field 306; ... ; the H attribute values associated with the attribute P=N-1 in field 308; the H attribute values associated with the attribute P=N in field 310. Thus, the memory management unit may determine the paging attribute values associated with guest memory pages and copy the mapping store in field 304 and the attribute values associated with the determined attributes 306-310 to the TLB entries.

When a memory access violates the attributes as defined EPTE entries, the processor (including the memory management unit) may transition control to the VMM (e.g., by way of a "VM exit"). Such transitions may include communication to the VMM about the memory access and about the access right(s) that were violated. Embodiments of the present disclosure may also communicate to the VMM the GPA paging attribute (e.g., U/S mode).

Figure 4:
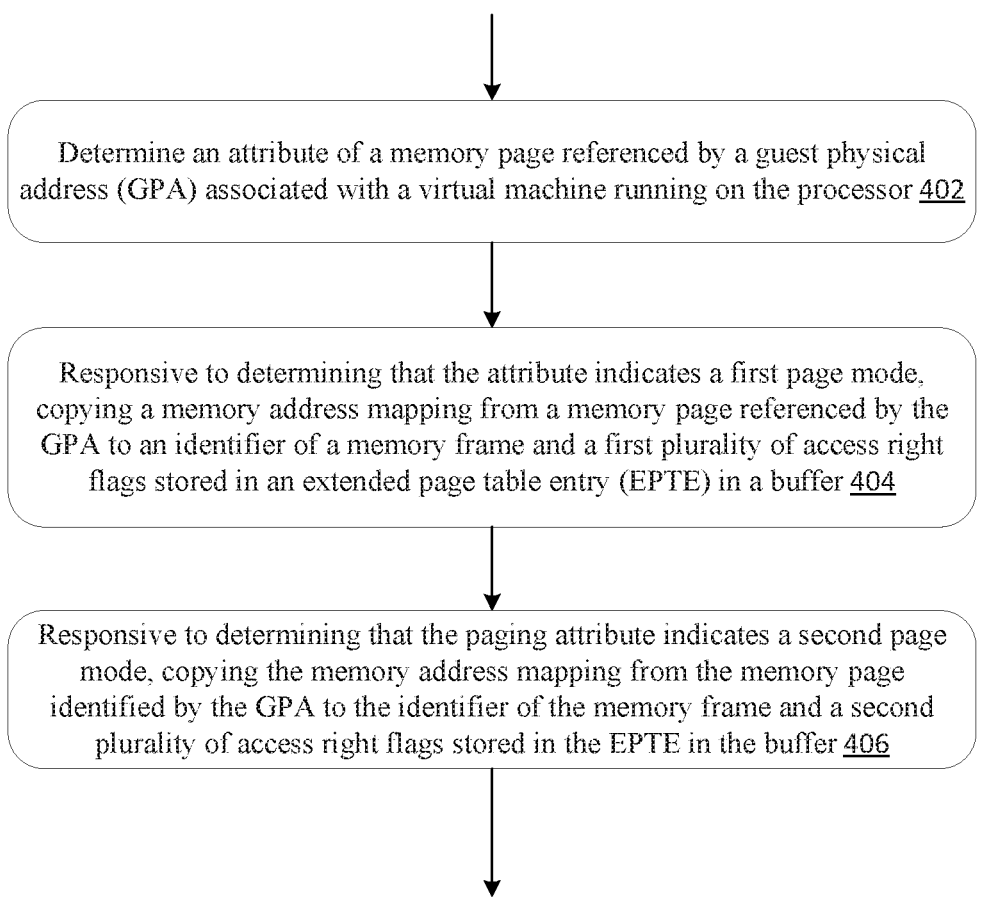
FIG. 4 is a block diagram of a method to perform memory address mapping according to an embodiment of the present disclosure.

FIG. 4 is a block diagram of a method 400 to perform memory address mapping according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of processor 102 as shown in FIG. 1.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, processor 102 may determine an attribute of a memory page referenced by a guest physical address (GPA) associated with a virtual machine running on the processor. For example, the attribute value may indicate a user mode or a supervisor mode of a guest virtual address as determined by the guest operating system operating in the virtual machine running on the processor.

At 404, processor 102 may responsive to determining that the paging attribute value indicates a first value, copy a memory address mapping from the GPA page to a memory frame of a memory and a first plurality of access right flags stored in an extended page table entry (EPTE) in a buffer entry.

At 406, processor 102 may responsive to determining that the paging attribute indicates a second value, copying the memory address mapping from the memory page identified by the GPA to the identifier of the memory frame and a second plurality of access right flags stored in the EPTE in the buffer, in which the processor is to allow accessing the memory frame based on the access right flags in the buffer entry.

Figure 5:
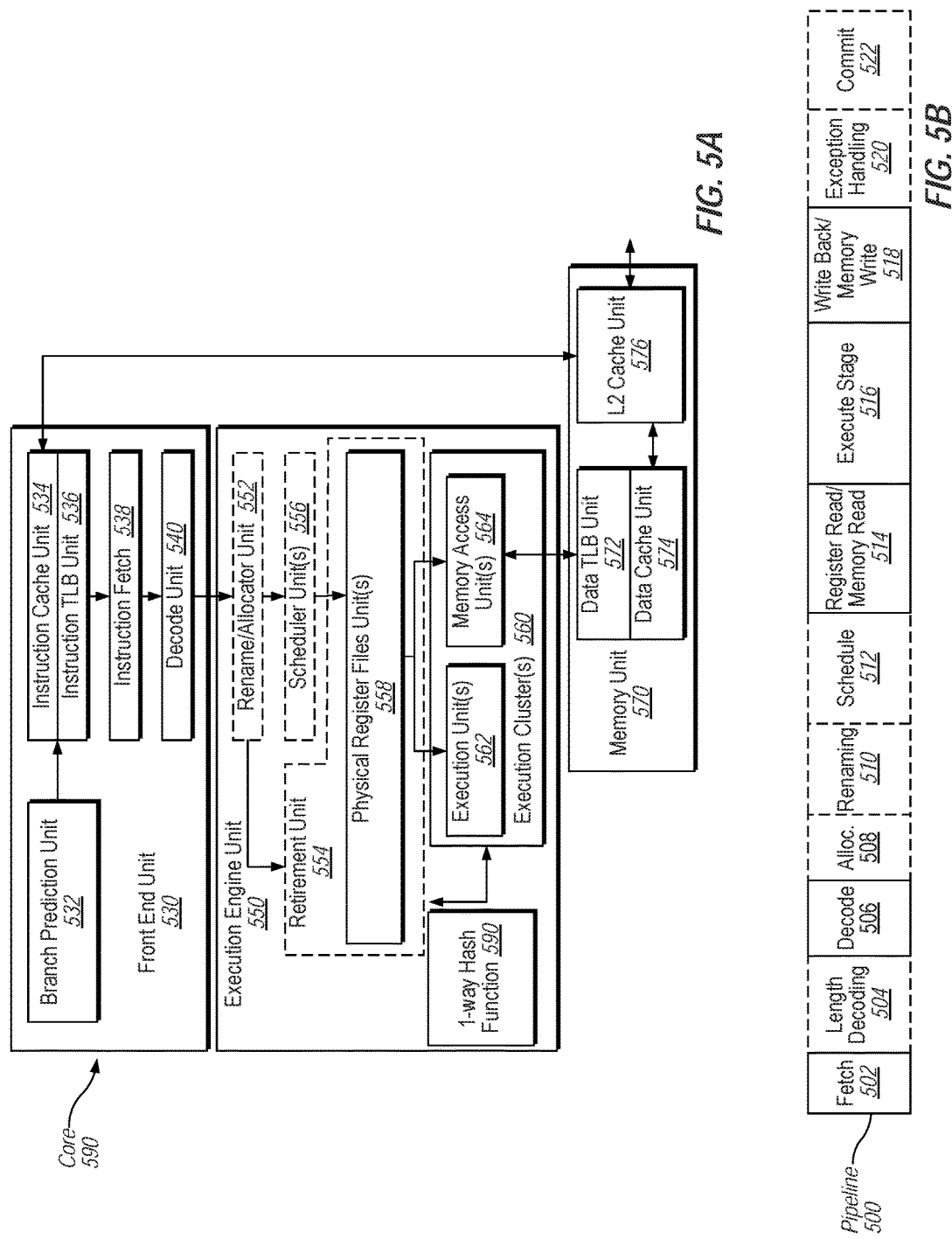
FIG. 5A is a block diagram illustrating a micro-architecture for a processor including heterogeneous core in which one embodiment of the disclosure may be used.
FIG. 5B is a block diagram illustrating an in-order pipeline and a register renaming stage, out-of-order issue/execution pipeline implemented according to at least one embodiment of the disclosure.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may be part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefeteching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
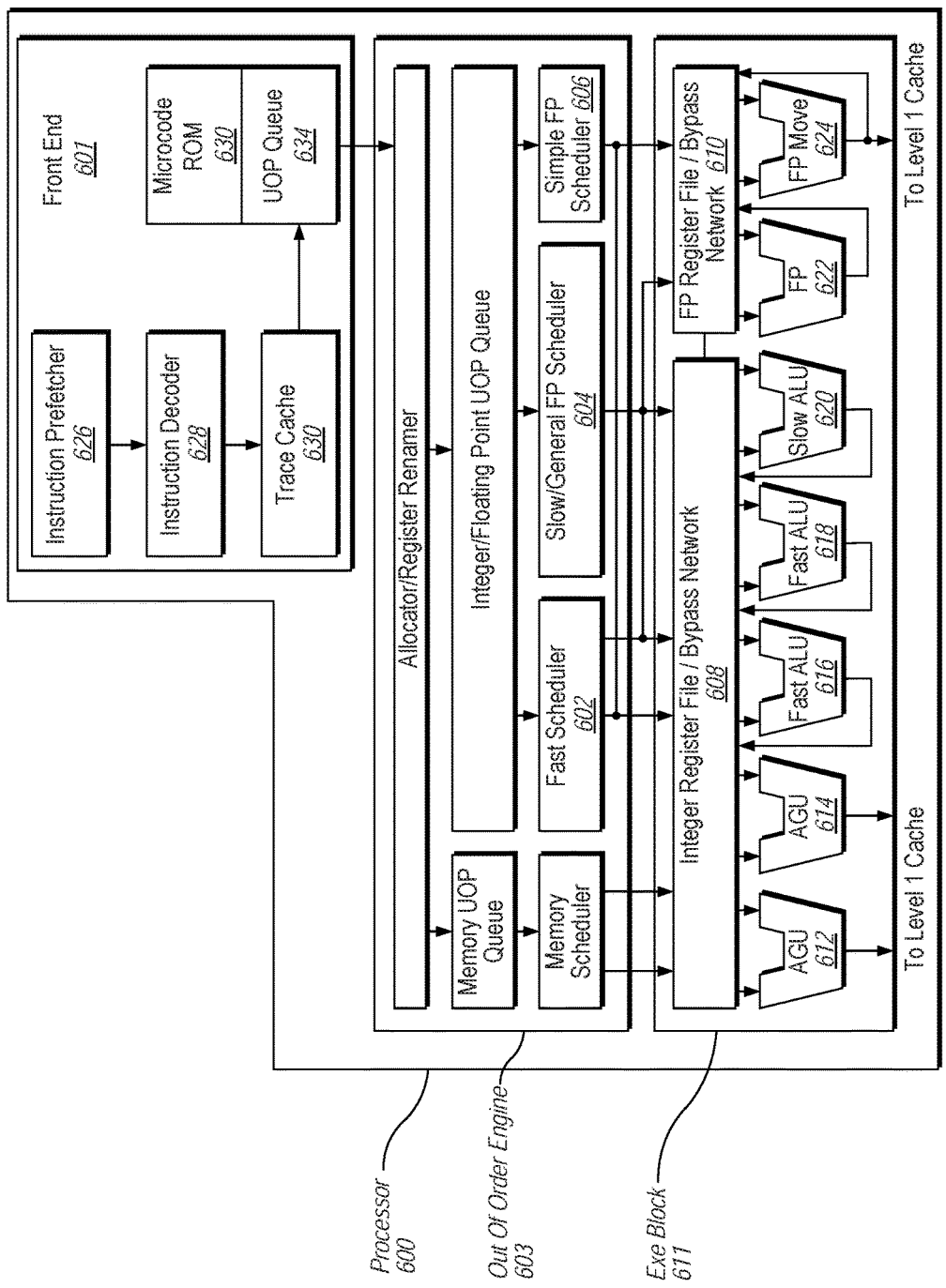
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
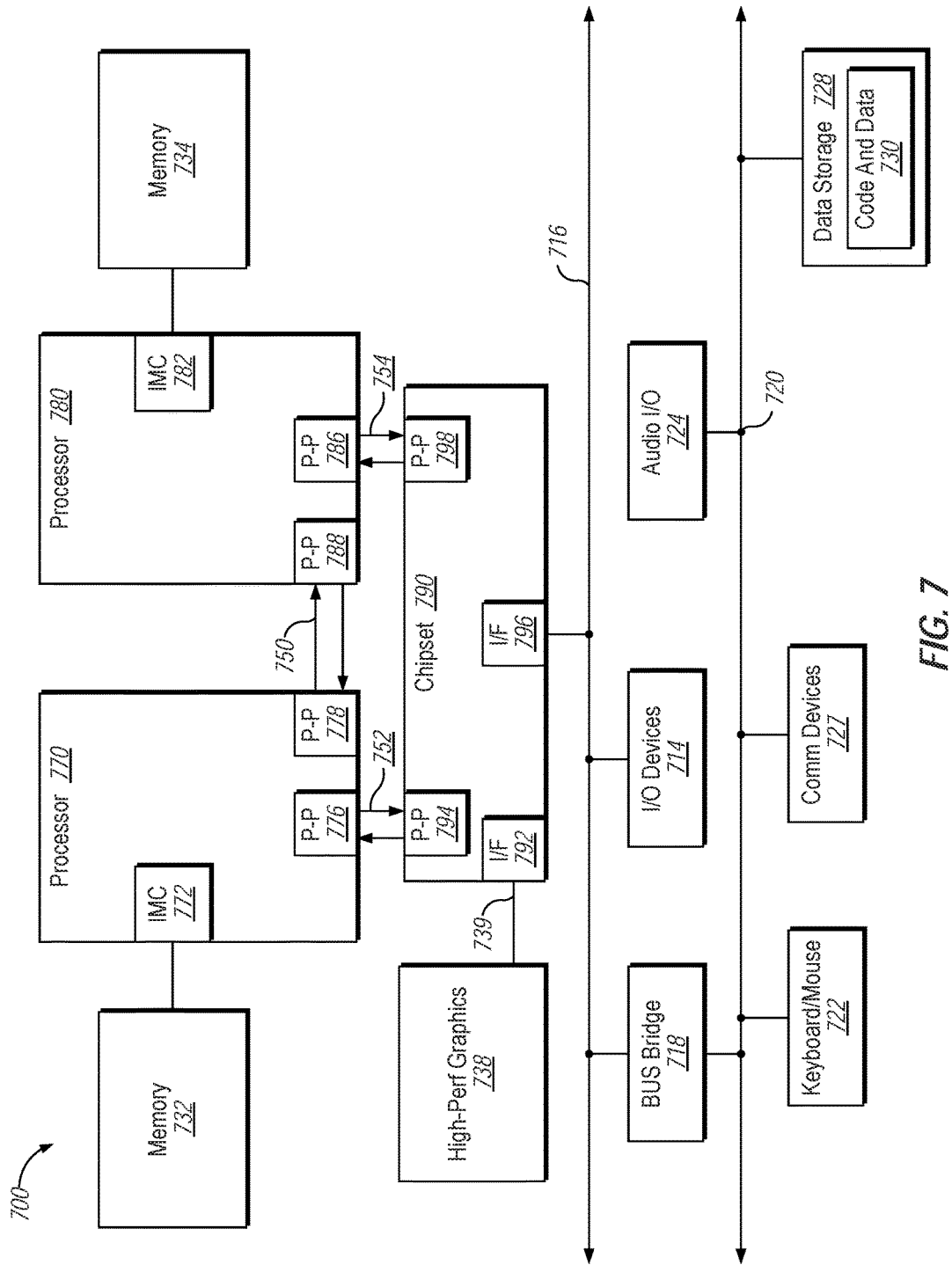
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
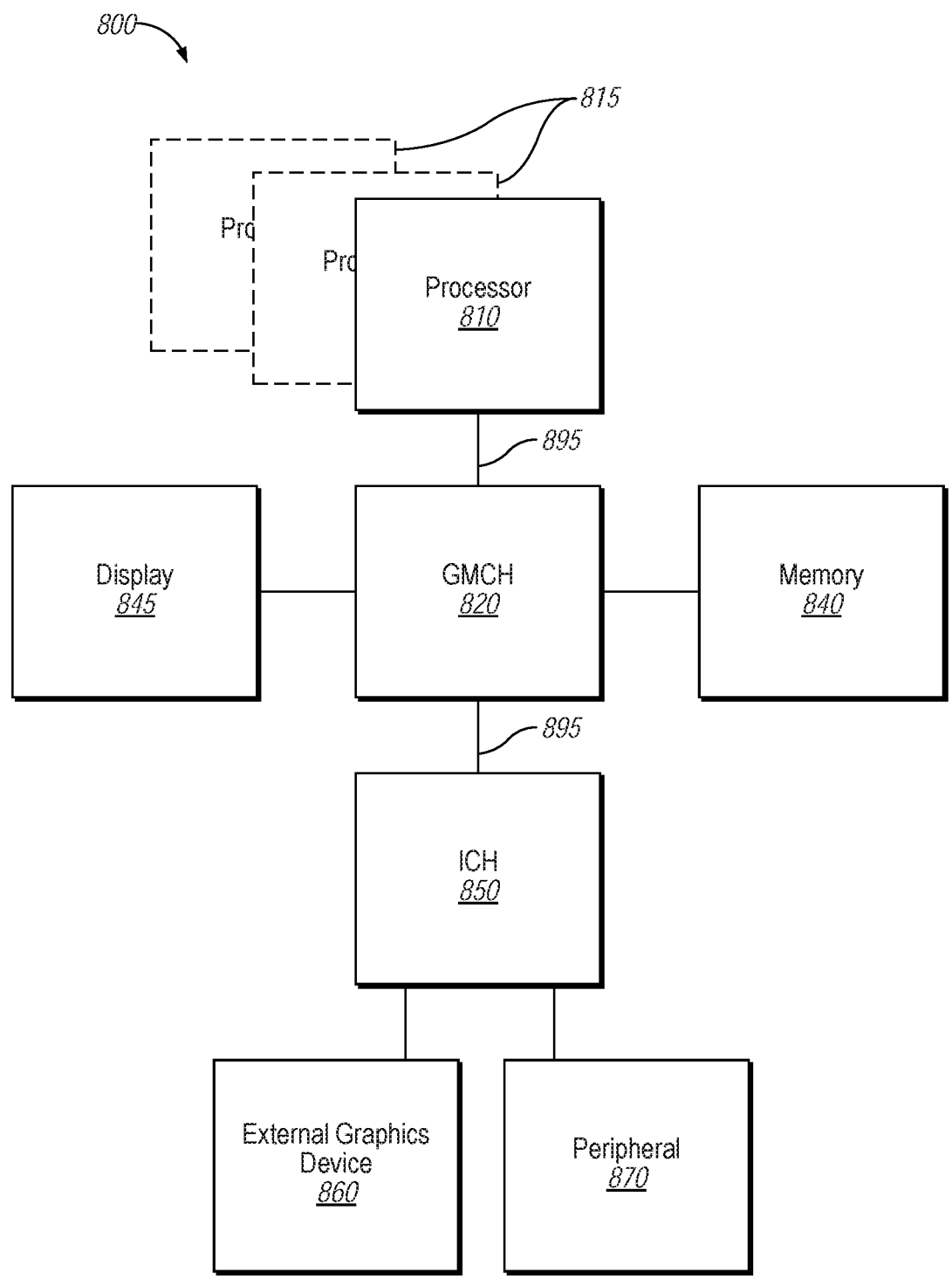
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
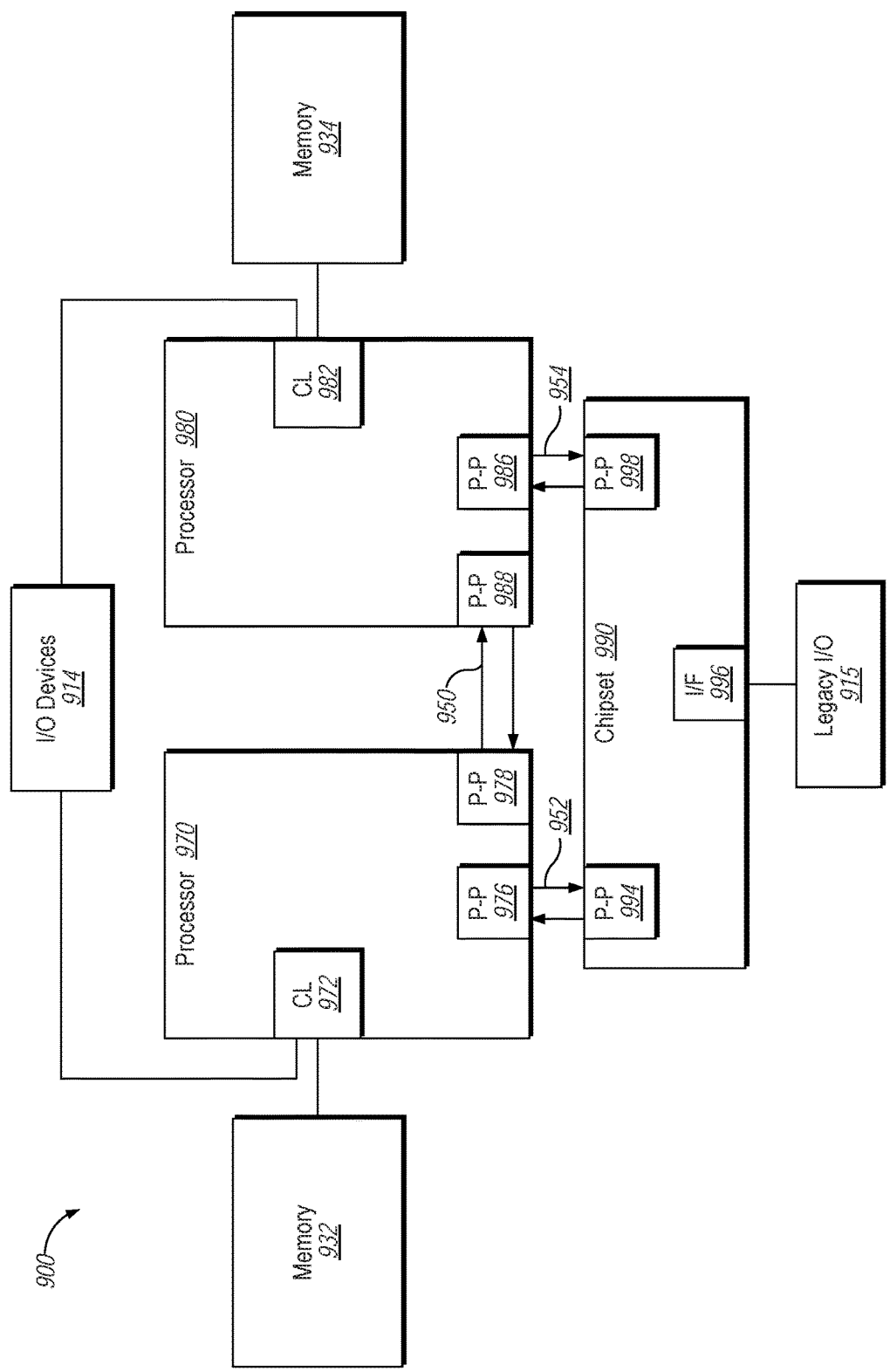
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
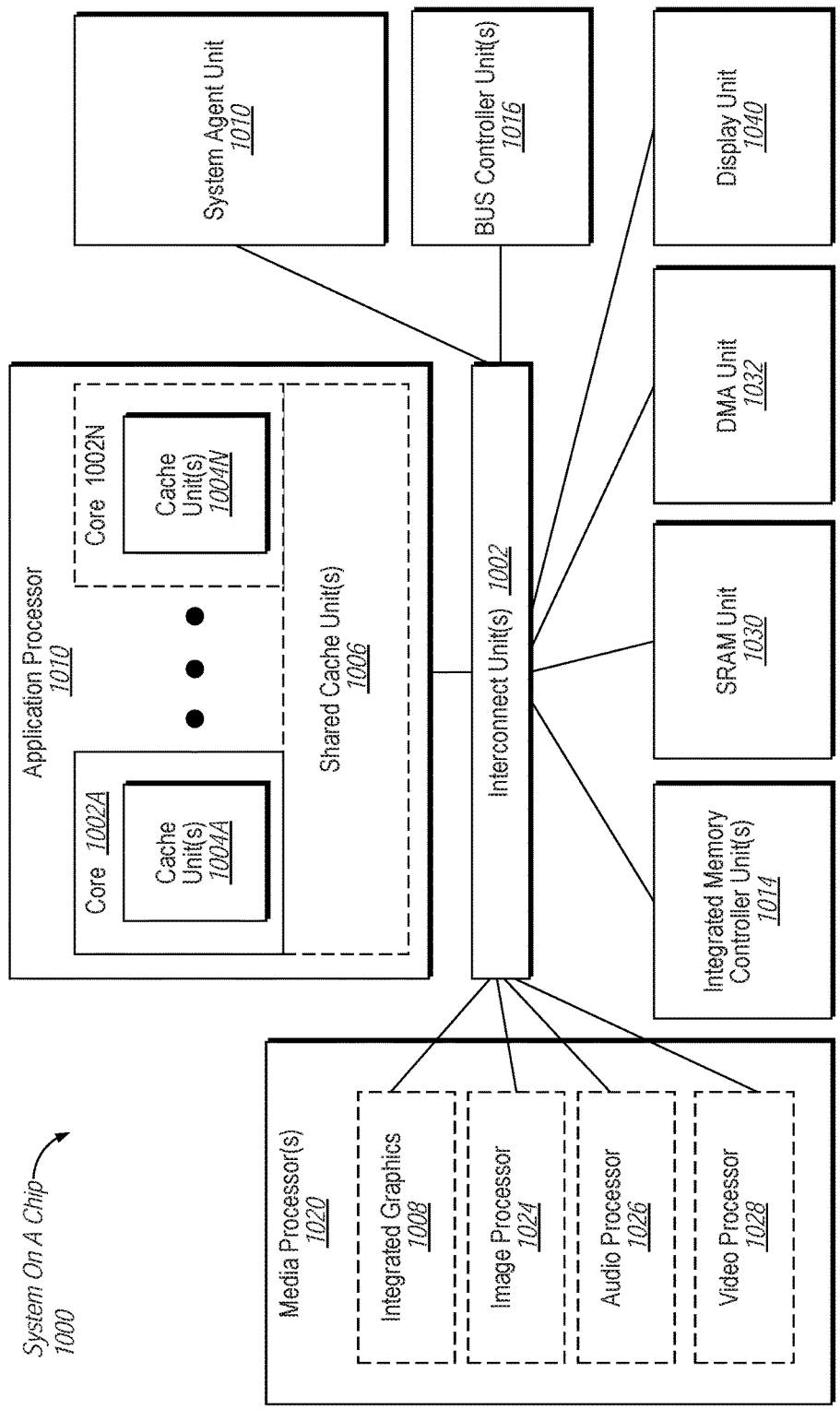
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
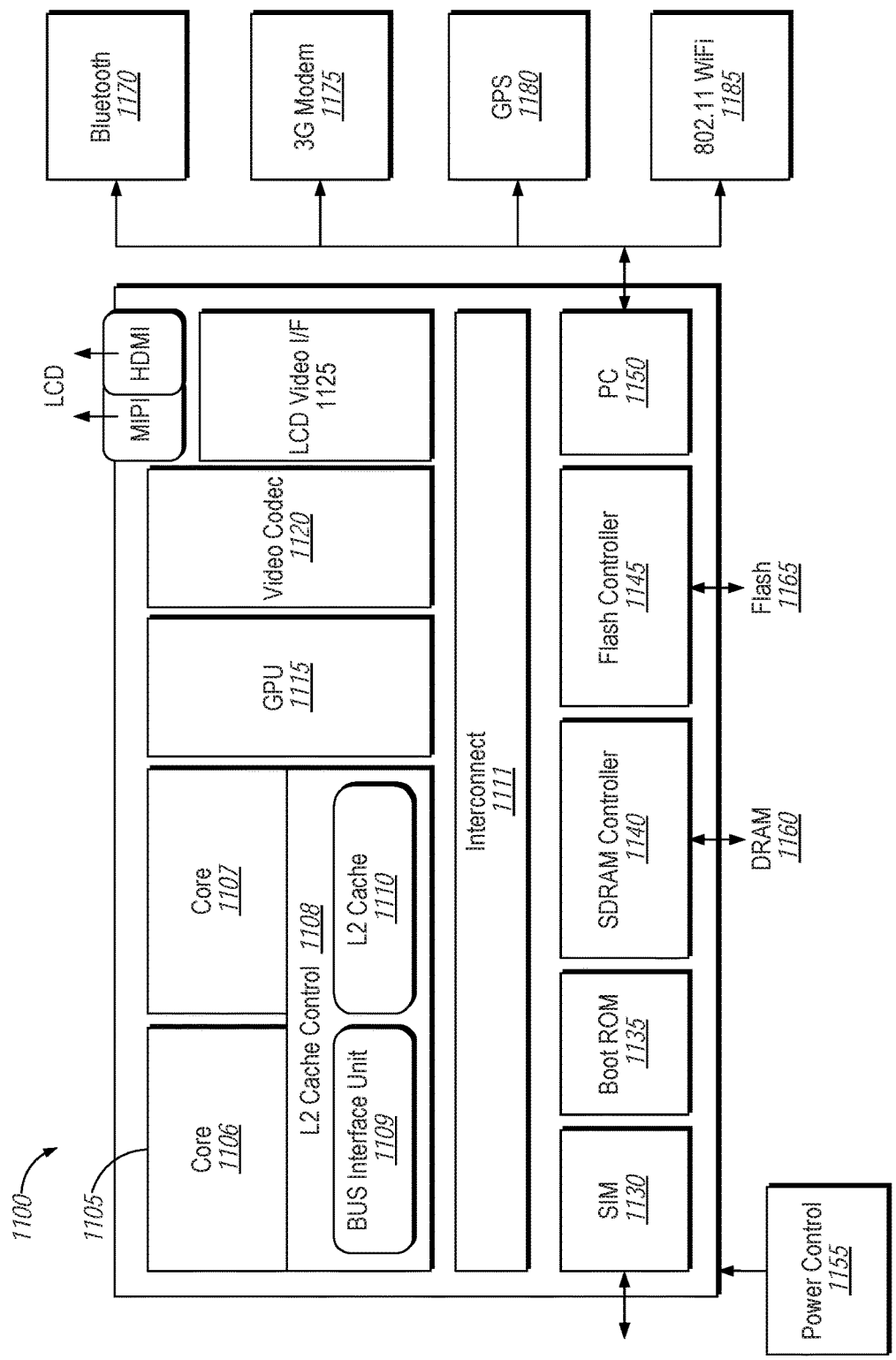
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores-1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g.

Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
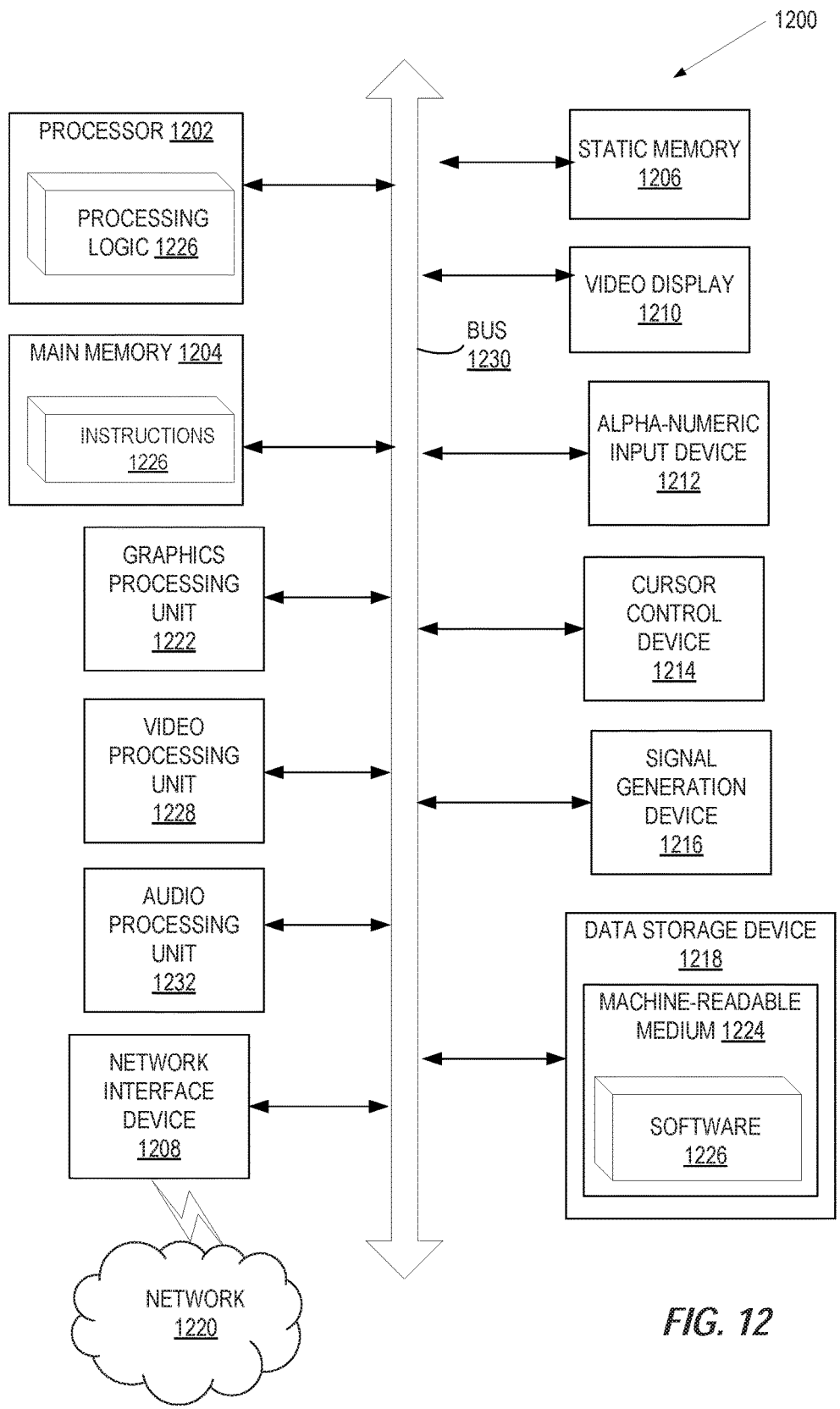
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor architecture 100 described with respect to FIG. 1 as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processing system including a processing core to execute a virtual machine (VM) comprising a guest operating system (OS) and a memory management unit, communicatively coupled to the processing core, comprising a storage device to store an extended page table entry (EPTE) comprising a mapping from a guest physical address (GPA) associated with the guest OS to an identifier of a memory frame, a first plurality of access right flags associated with accessing the memory frame in a first page mode referenced by an attribute of a memory page identified by the GPA, and a second plurality of access right flags associated with accessing the memory frame in a second page mode referenced by the attribute of the memory page identified by the GPA, wherein the memory management unit is to responsive to determining that the GPA is associated with the first page mode, allow accessing the memory frame based on the first plurality of access right flags; and responsive to determining that the GPA is associated with the second page mode, allow accessing the memory frame based on the second plurality of access right flags.

In Example 2, the subject matter of Example 1 can optionally provide that the processing core is further to execute a virtual machine monitor (VMM) to support the VM, wherein the VMM is to specify the first plurality of access right flags and the second plurality of access right flags stored in the EPTE based on a plurality of rules stored in a policy data structure.

In Example 3, the subject matter of any of Examples 1 and 2 can optionally provide that the first page mode of the GPA is a user mode assigned to a corresponding guest virtual address (GVA) by the guest OS and the second page mode of the GPA is a supervisor mode assigned to the corresponding GVA by the guest OS.

In Example 4, the subject matter of Example 3 can optionally provide that the first plurality of access right flags comprises at least one of a read access flag, a write access flag, or an execute access flag.

In Example 5, the subject matter of Example 3 an optionally provide that the second plurality of access right flags comprises at least one of a read access flag, a write access flag, or an execute access flag.

In Example 6, the subject matter of Example 3 an optionally provide that responsive to determining that a user/supervisor (U/S) status flag indicates the user mode, store the mapping and the first plurality of access right flags in a buffer entry, and responsive to determining that the U/S status flag indicates the supervisor mode, store the mapping and the second plurality of access right flags in the buffer entry.

In Example 7, the subject matter of Example 6 an optionally provide that the buffer entry is a translation lookaside buffer (TLB) entry associated with the processing system.

In Example 8, the subject matter of Example 6 an optionally provide that responsive to detecting a memory access violation based on one of the first plurality of access right flags or the second plurality of access right flags, communicate, to the VMM, the GPA and an access right that is violated.

In Example 9, the subject matter of Example 1 an optionally provide that the first attribute value is associated with a memory frame present attribute, and the second attribute value is associated with a memory frame absent attribute.

Example 10 is a system-on-a-chip (SoC) comprising a memory to store an extended page table entry (EPTE), and a processor, communicatively coupled to the memory, comprising a processing core to execute a virtual machine (VM) comprising a guest operating system (OS), and a memory management unit, communicatively coupled to the processing core, comprising a storage device to store the EPTE comprising a mapping from a guest physical address (GPA) associated with the guest OS to an identifier of a memory frame, a first plurality of access right flags associated with accessing the memory frame in a first page mode referenced by an attribute of a memory page identified by the GPA, and a second plurality of access right flags associated with accessing the memory frame in a second page mode referenced by the attribute of the memory page identified by the GPA, wherein the memory management unit is to responsive to determining that the GPA is associated with the first page mode, allow accessing the memory frame based on the first plurality of access right flags and responsive to determining that the GPA is associated with the second page mode, allow accessing the memory frame based on the second plurality of access right flags.

In Example 11, the subject matter of Example 10 an optionally provide that execute a virtual machine monitor (VMM) to support the VM, wherein the VMM is to specify the first plurality of access right flags and the second plurality of access right flags stored in the EPTE based on a plurality of rules stored in a policy data structure.

In Example 12, the subject matter of any of Examples 10 and 11 can optionally provide that the first page mode of the GPA is a user mode assigned to a corresponding guest virtual address (GVA) by the guest OS and the second page mode of the GPA is a supervisor mode assigned to the corresponding GVA by the guest OS.

In Example 13, the subject matter of Example 12 an optionally provide that the first plurality of access right flags comprises at least one of a read access flag, a write access flag, or an execute access flag.

In Example 14, the subject matter of Example 12 an optionally provide that the second plurality of access right flags comprises at least one of a read access flag, a write access flag, or an execute access flag.

In Example 15, the subject matter of Example 12 an optionally provide that the memory management unit is to responsive to determining that a user/supervisor (U/S) status flag indicates the user mode, store the mapping and the first plurality of access right flags in a buffer entry, and responsive to determining that the U/S status flag indicates the supervisor mode, store the mapping and the second plurality of access right flags in the buffer entry.

In Example 16, the subject matter of Example 15 an optionally provide that the memory management unit is further to responsive to detecting a memory access violation based on one of the first plurality of access right flags or the second plurality of access right flags, communicate to the VMM the GPA and an access right that is violated.

In Example 17, the subject matter of Example 10 an optionally provide that the first attribute value is associated with a memory frame present attribute, and the second attribute value is associated with a memory frame absent attribute.

Example 18 is a method comprising determining, by a processor, an attribute of a memory page referenced by a guest physical address (GPA) associated with a virtual machine running on the processor, responsive to determining that the attribute indicates a first page mode, copying a memory address mapping from a memory page identified by the GPA to an identifier of a memory frame and a first plurality of access right flags stored in an extended page table entry (EPTE) in a buffer, and responsive to determining that the paging attribute indicates a second page mode, copying the memory address mapping from the memory page identified by the GPA to the identifier of the memory frame and a second plurality of access right flags stored in the EPTE in the buffer, wherein the processor is to allow accessing the memory frame based on the access right flags in the buffer entry.

In Example 19, the subject matter of Example 18 an optionally provide that the processor is further to execute a virtual machine monitor (VMM) to support the VM, wherein the VMM is to specify the first plurality of access right flags and the second plurality of access right flags stored in the EPTE.

In Example 20, the subject matter of any of Examples 18 and 19 can optionally provide that the first page mode of the GPA is a user mode assigned to a corresponding guest virtual address (GVA) by the guest OS and the second page mode of the GPA is a supervisor mode assigned to the corresponding GVA by the guest OS.

Example 21 is an apparatus including means for performing the method of any of Examples 18 and 19.

Example 22 is a machine-readable non-transitory medium having stored thereon program code that, when executed by a processor, perform operations comprising determining, by the processor, an attribute of a memory page referenced by a guest physical address (GPA) associated with a virtual machine running on the processor, responsive to determining that the attribute indicates a first page mode, copying a memory address mapping from a memory page referenced by the GPA to an identifier of a memory frame and a first plurality of access right flags stored in an extended page table entry (EPTE) in a buffer, and responsive to determining that the paging attribute indicates a second page mode, copying the memory address mapping from the memory page referenced by the GPA to the identifier of the memory frame and a second plurality of access right flags stored in the EPTE in the buffer, wherein the processor is to allow accessing the memory frame based on the access right flags in the buffer entry.

In Example 23, the subject matter of Example 22 an optionally provide that the operations further comprises executing a virtual machine monitor (VMM) to support the VM, wherein the VMM is to specify the first plurality of access right flags and the second plurality of access right flags stored in the EPTE.

In Example 24, the subject matter of Examples 22 and 23 an optionally provide that the first page mode of the GPA is a user mode assigned to a corresponding guest virtual address (GVA) by the guest OS and the second page mode of the GPA is a supervisor mode assigned to the corresponding GVA by the guest OS.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processing system comprising:
a memory management unit to store an extended page table entry (EPTE) of an extended page table stored in memory, the EPTE to map a guest physical address (GPA) to an identifier of a memory frame associated with a host physical address (HPA); and
a processing core communicatively coupled to the memory management unit, the processing core to execute a virtual machine (VM) comprising a guest operating system (OS) and to execute a virtual machine monitor (VMM) to support the VM, wherein the VMM is to create the EPTE to include access right flags for the GPA corresponding to one of a user mode or a supervisor mode assigned by the guest OS, wherein to create the EPTE, the VMM is to:
store, in the EPTE using rules of a policy data structure, values of a first plurality of access right flags associated with accessing the memory frame in the user mode referenced by an attribute of a memory page identified by the GPA, wherein the first plurality of access right flags comprises a user read (RU) flag, a user write (WU) flag, and a user execute (XU) flag; and
store, in the EPTE using the rules of the policy data structure, values of a second plurality of access right flags associated with accessing the memory frame in the supervisor mode referenced by the attribute of the memory page identified by the GPA, wherein the second plurality of access right flags comprises a supervisor read (RS) flag, a supervisor write (WS) flag, and a supervisor execute (XS) flag; and
wherein the memory management unit is to:
determine whether a configuration flag is set to enable or disable a user/supervisor (U/S) bit value;
responsive to the configuration flag not being set:
copy, to a buffer entry, a mapping between the GPA and the identifier of the memory frame and predetermined access right flags for read (R), write (W), and execute (X); and
disregard the U/S bit value.

2. The processing system of claim 1, wherein the memory management unit is further to:
responsive to determining that the GPA is associated with the user mode, allow user-level access of the memory frame based on the values of the first plurality of access right flags; and
responsive to determining that the GPA is associated with the supervisor mode, allow supervisor-level access of the memory frame based on the values of the second plurality of access right flags.

3. The processing system of claim 1, wherein the buffer entry is a translation lookaside buffer (TLB) entry associated with the processing system.

4. The processing system of claim 1, wherein the memory management unit is further to, responsive to detecting a memory access violation based on one of the first plurality of access right flags or the second plurality of access right flags, communicate, to the VMM, the GPA and an access right that is violated.

5. The processing system of claim 1, wherein the attribute of the memory page comprises one of a first attribute value associated with a memory frame present attribute or a second attribute value associated with a memory frame absent attribute.

6. The processing system of claim 1, wherein, responsive to the configuration flag being set and determining that the U/S bit value indicates the user mode, store, in the buffer entry, a mapping between the GPA and the identifier of the memory frame and the first plurality of access right flags; and, responsive to the configuration flag being set and determining that the U/S bit value indicates the supervisor mode, store the mapping and the second plurality of access right flags in the buffer entry.

7. A system-on-a-chip (SoC) comprising:
a memory to store an extended page table entry (EPTE) of an extended page table, the EPTE to map a guest physical address (GPA) to an identifier of a memory frame associated with a host physical address (HPA); and a processor, communicatively coupled to the memory, comprising:
  a memory management unit to store the EPTE in a register; and
  a processing core communicatively coupled to the memory management unit, the processing core to execute a virtual machine (VM) comprising a guest operating system (OS) and to execute a virtual machine monitor (VMM) to support the VM, wherein the VMM is to create the EPTE to include access right flags for the GPA corresponding to one of a user mode or a supervisor mode assigned by the guest OS, wherein to create the EPTE, the VMM is to:
    store, in the EPTE using rules of a policy data structure, values of a first plurality of access right flags associated with accessing the memory frame in the user mode referenced by an attribute of a memory page identified by the GPA, wherein the first plurality of access right flags comprises a user read (RU) flag, a user write (WU) flag, and a user execute (XU) flag; and
    store, in the EPTE using the rules of the policy data structure, values of a second plurality of access right flags associated with accessing the memory frame in the supervisor mode referenced by the attribute of the memory page identified by the GPA, wherein the second plurality of access right flags comprises a supervisor read (RS) flag, a supervisor write (WS) flag, and a supervisor execute (XS) flag; and
  wherein the memory management unit is further to:
    determine whether a configuration flag is set to enable or disable a user/supervisor (U/S) bit value;
    responsive to the configuration flag not being set:
      copy, to a buffer entry, a mapping between the GPA and the identifier of the memory frame and predetermined access right flags for read (R), write (W), and execute (X); and
      disregard the U/S bit value.

8. The SoC of claim 7, wherein the memory management unit is further to:
  responsive to determining that the GPA is associated with the user mode, allow user-level access of the memory frame based on the values of the first plurality of access right flags; and
  responsive to determining that the GPA is associated with the supervisor mode, allow supervisor-level access of the memory frame based on the values of the second plurality of access right flags.

9. The SoC of claim 7, wherein the memory management unit is further to, responsive to detecting a memory access violation based on one of the first plurality of access right flags or the second plurality of access right flags, communicate to the VMM the GPA and an access right that is violated.

10. The SoC of claim 7, wherein the attribute of the memory page comprises one of a first attribute value associated with a memory frame present attribute or a second attribute value associated with a memory frame absent attribute.

11. The SoC of claim 7, wherein, responsive to the configuration flag being set and determining that the U/S bit value indicates the user mode, store, in the buffer entry, a mapping between the GPA and the identifier of the memory frame and the first plurality of access right flags; and, responsive to the configuration flag being set and determining that the U/S bit value indicates the supervisor mode, store the mapping and the second plurality of access right flags in the buffer entry.

12. A method comprising:
  determining, by a processor, an attribute of a memory page referenced by a guest physical address (GPA) associated with a virtual machine (VM) running on the processor, the VM comprising a guest operating system (OS);
  assigning, by the guest OS to a guest virtual address (GVA) corresponding to the GPA, page modes comprising one of a user mode or a supervisor mode;
  creating, by a virtual machine monitor (VMM) executing on the processor that controls the VM, an extended page table entry (EPTE) that maps the GPA to an identifier of a memory frame associated with a host physical address (HPA) and that includes access right flags for the GPA corresponding to the one of the user mode or the supervisor mode, wherein creating comprises:
    storing, in the EPTE using rules of a policy data structure, values of a first plurality of access right flags associated with accessing the memory frame in the user mode referenced by the attribute of the memory page identified by the GPA, wherein the first plurality of access right flags comprises a user read (RU) flag, a user write (WU) flag, and a user execute (XU) flag; and
    storing, in the EPTE using the rules of the policy data structure, values of a second plurality of access right flags associated with accessing the memory frame in the supervisor mode referenced by the attribute of the memory page identified by the GPA, wherein the second plurality of access right flags comprises a supervisor read (RS) flag, a supervisor write (WS) flag, and a supervisor execute (XS) flag;
  determining, by the processor, whether a configuration flag is set to enable or disable a user/supervisor (U/S) bit value;
  responsive to the configuration flag not being set:
    copying, to a buffer entry, a mapping between the GPA and the identifier of the memory frame and predetermined access right flags for read (R), write (W), and execute (X); and
    disregarding the U/S bit value.

13. The method of claim 12, further comprising:
  responsive to determining that the GPA is associated with the user mode, allowing user-level access, by the processor, of the memory frame based on the values of the first plurality of access right flags; and
  responsive to determining that the GPA is associated with the supervisor mode, allowing supervisor-level access, by the processor, of the memory frame based on the values of the second plurality of access right flags.

14. The method of claim 12, wherein the buffer entry is a translation lookaside buffer (TLB) entry associated with the processor.

15. The method of claim 12, further comprising, responsive to detecting a memory access violation based on one of the first plurality of access right flags or the second plurality of access right flags, communicating, to the VMM, the GPA and an access right that is violated.

16. The method of claim 12, wherein the attribute of the memory page comprises one of a first attribute value associated with a memory frame present attribute or a second attribute value associated with a memory frame absent attribute.

17. The method of claim 12, further comprising:
responsive to determining that the attribute indicates the user mode, copying the first plurality of access right flags stored in the EPTE to a corresponding field of a buffer entry of a translation lookaside buffer (TLB);
responsive to determining that the attribute indicates the supervisor mode, copying the second plurality of access right flags stored in the EPTE to the corresponding field of the buffer entry; and
allowing access, by the processor, to the memory frame based on one of the first and second plurality of access right flags in the buffer entry.

18. The method of claim 12, wherein, responsive to the configuration flag being set and determining that the U/S bit value indicates the user mode, storing, in the buffer entry, a mapping between the GPA and the identifier of the memory frame and the first plurality of access right flags; and, responsive to the configuration flag being set and determining that the U/S bit value indicates the supervisor mode, storing the mapping and the second plurality of access right flags in the buffer entry.

\* \* \* \* \*